(12) United States Patent
Ferray

(10) Patent No.: US 6,876,854 B1
(45) Date of Patent: Apr. 5, 2005

(54) MOBILE COMMUNICATION SYSTEM USING LOSS CABLES AS TRANSMISSION ELEMENTS

(75) Inventor: Jean-Pierre Ferray, Courcouronnes (FR)

(73) Assignee: Matra Nortel Communications, Quimper (FR)

( * ) Notice: Subject to any disclaimer, the term of this patent is extended or adjusted under 35 U.S.C. 154(b) by 347 days.

(21) Appl. No.: 09/723,345

(22) Filed: Nov. 27, 2000

(30) Foreign Application Priority Data

Nov. 26, 1999 (FR) .......................................... 99 14904

(51) Int. Cl.[7] .................................................. H04Q 7/20
(52) U.S. Cl. .......................................... 455/443; 455/7
(58) Field of Search ................................ 455/14, 7, 17, 455/25, 440, 441, 443, 436, 434, 439, 438, 13.1, 12.1, 1

(56) References Cited

U.S. PATENT DOCUMENTS 3,629,707 A   12/1971  Takeshi et al.
5,913,169 A * 6/1999  Vaara .......................... 455/443
6,073,019 A * 6/2000  Lowdon ....................... 455/436

FOREIGN PATENT DOCUMENTS

| GB | WO 98/35511 | * 6/1998 | ............ H04Q/7/20 |
| WO | WO 97/16892 | 5/1997 | |
| WO | WO 98/35511 | 8/1998 | |

* cited by examiner

*Primary Examiner*—Nay Maung
*Assistant Examiner*—Tanmay Lele
(74) *Attorney, Agent, or Firm*—Trop, Pruner & Hu, P.C.

(57) ABSTRACT

Runs of loss cable are disposed in succession along a zone of radio coverage and coupled with feeder means from base stations of a cellular mobile communication network. The feeder means apply first radio frequency signals from a first base station to a first cable run and second radio frequency signals from a second base station to a second cable run, adjacent to the first run. They also apply at least part of the second radio frequency signals to the first cable run, preferably attenuated relative to the first radio frequency signals as applied to the first cable run, creating a zone of partial coverage between adjacent cells in order to facilitate operation of an automatic cell changeover during calls.

8 Claims, 3 Drawing Sheets

MOBILE COMMUNICATION SYSTEM USING LOSS CABLES AS TRANSMISSION ELEMENTS

TECHNICAL FIELD

The present invention relates to the field of cellular mobile communications and more specifically to the aspects inherent in operating cellular networks in confined or underground environments, such as tunnels.

BACKGROUND OF THE INVENTION

Each cell within a cellular mobile communication system is serviced by a base station. When it is switched on, a mobile station selects the base station with which it will secure the best radio link. If the mobile station is moved and changes cell, it can than re-select another base station. This selection/reselection process takes place with the aid of a beacon signal which is transmitted on a specific frequency by each base station.

In many systems, the changeover of cell may also take place during a call, in which case it will be managed by a process known as <<handover>>. The base station providing the radio link to the mobile station sends data to it, identifying the channels on which the base stations of neighbouring cells are transmitting their beacon signals. This information may consist of a list of frequencies relating respectively to the beacon signals of adjacent cells. In parallel with the communication, the mobile station monitors these frequencies. A comparison is run between the reception conditions in the cell currently being serviced and in the adjacent cells so that a decision can be taken as to the time at which the changeover of cell should be effected. Depending on the systems, this decision is taken either at the level of the mobile stations or at the level of the fixed infrastructure.

In confined environments, in which radio waves are not readily propagated, the continuity of cellular mobile communication services is sometimes provided by means of transmission cables installed along the zones where service has to be provided. These cables are generally of the coaxial type, having an imperfect external shield so that losses in radiation will provide radio coverage in the zone in question. These are used in railway tunnels in particular. Taking the example of an underground railway system, the base stations of the cellular system are positioned in stations, typically spaced apart by 500 to 1500 meters, and linked to loss cables extending along the tunnels between stations.

Using loss cables poses a problem when it comes to the handover procedure because the field emitted by such a cable fades abruptly at the ends of the cable. The successive runs of cable are usually placed end to end which means that there is only very low coverage of the cells at the boundaries. Under these conditions, the mobile station does not have time to perform the steps needed with respect to the beacon signal of the adjacent cell to be able to run the handover, particularly as the mobile station is generally moving at quite a high speed (in the example of the underground railway, the boundary between two cells is usually in the middle of a tunnel between two stations, i.e. at a point where the rolling stock is travelling at full speed). Consequently, there is a risk that the call will be cut off due to the fact that the mobile station has not been able to run the requisite steps before entering a new cell.

In order to remedy this problem, publication WO97/16 892 proposes a system of overlapping successive lengths of cable belonging to two neighbouring cells over a certain length at the boundary of these cells, one of the two lengths being provided with an attenuator positioned so that it will attenuate the radiation of one of the two cables in the overlap zone. This attenuation is such that the mobile station is able to continue communicating with the base station feeding the cable equipped with the attenuator when directed towards the other cell, whilst running the necessary steps to operate the handover on the beacon signal transmitted from the other cell without any attenuation. The disadvantage of this method is that the level of the signals, already low at the ends of the cable prior to attenuation, become unusable for practical purposes once attenuated unless the overlap between the runs is relatively long. However, the cost of installing a long overlap is high, given the price of loss cables. Furthermore, the method is uni-directional: in the case of a tunnel in which trains are travelling in the two directions, handovers are only possible in one direction. Furthermore, installation requires work to be carried out in the middle of the tunnels if the railway network is equipped with preexisting loss cables, which complicates the installation process.

Another drawback of this solution is the fact that the attenuation is applied to all the signals carried by the cables. Very often, these cables carry several mobile communication services, provided by different cellular systems and/or run by different operators. The method is therefore not suitable if only one operator wants to use it.

SUMMARY OF THE INVENTION

One objective of this invention is to overcome the disadvantages outlined above in order to facilitate the handover between two adjacent cells in a confined or underground environment such as a tunnel.

The invention proposes a mobile communication system comprising runs of loss cables disposed successively along a zone of radio coverage and feeder means for feeding the cable runs from the base stations of at least one mobile communication network. The feeder means comprise means for applying first radio frequency signals emitted from a first base station of the cellular mobile communication network to a first cable run, means for applying second radio frequency signals emitted from a second base station of the cellular mobile communication network to a second cable run which is adjacent to the first run, and means for applying at least part of the second radio frequency signals to the first cable run.

Coverage between adjacent cells is provided by means of signals launched down the successive runs of cable. This secures greater flexibility in terms of installing the means needed to operate the handover under good conditions. In particular, there is no need for work to be carried out inside the tunnel and applying the solution does not necessarily mean involving all the signals carried by the cables. Nor does this solution involve overlapping the cables across runs of any great length, which makes it attractive in terms of cost.

In order to assist the process of selecting the best cell, said part of the second radio frequency signals is preferably applied to the first cable run with a given attenuation relative to the first radio frequency signals as applied to the first cable run.

In a typical application, the overlap of cells is symmetrical, i.e. the feeder means also have means for applying at least part of the first radio frequency signals to the second cable run, preferably with a given attenuation relative to the second radio frequency signals as applied to the second cable run.

Depending on the applications, the radio frequency signals (RF) of a cell, applied to the cable run closest to the adjacent cell, may contain all the signals transmitted by this cell or only some of them, namely the frequency carrying the beacon signal of the adjacent cell.

The system will generally incorporate means for collecting the radio signals picked up on the runs of loss cable. In one advantageous embodiment, these collection means have means for applying third radio frequency signals, which are transmitted from the first cable run, to the first base station and means for applying at least some of the third radio frequency signals to the second base station.

BRIEF DESCRIPTION OF THE DRAWINGS

Other features and advantages of the present invention will become clear from the description of examples given below, which are not restrictive in any respect, and with reference to the appended drawings, of which.

DETAILED DESCRIPTION OF THE INVENTION

Figure 1:
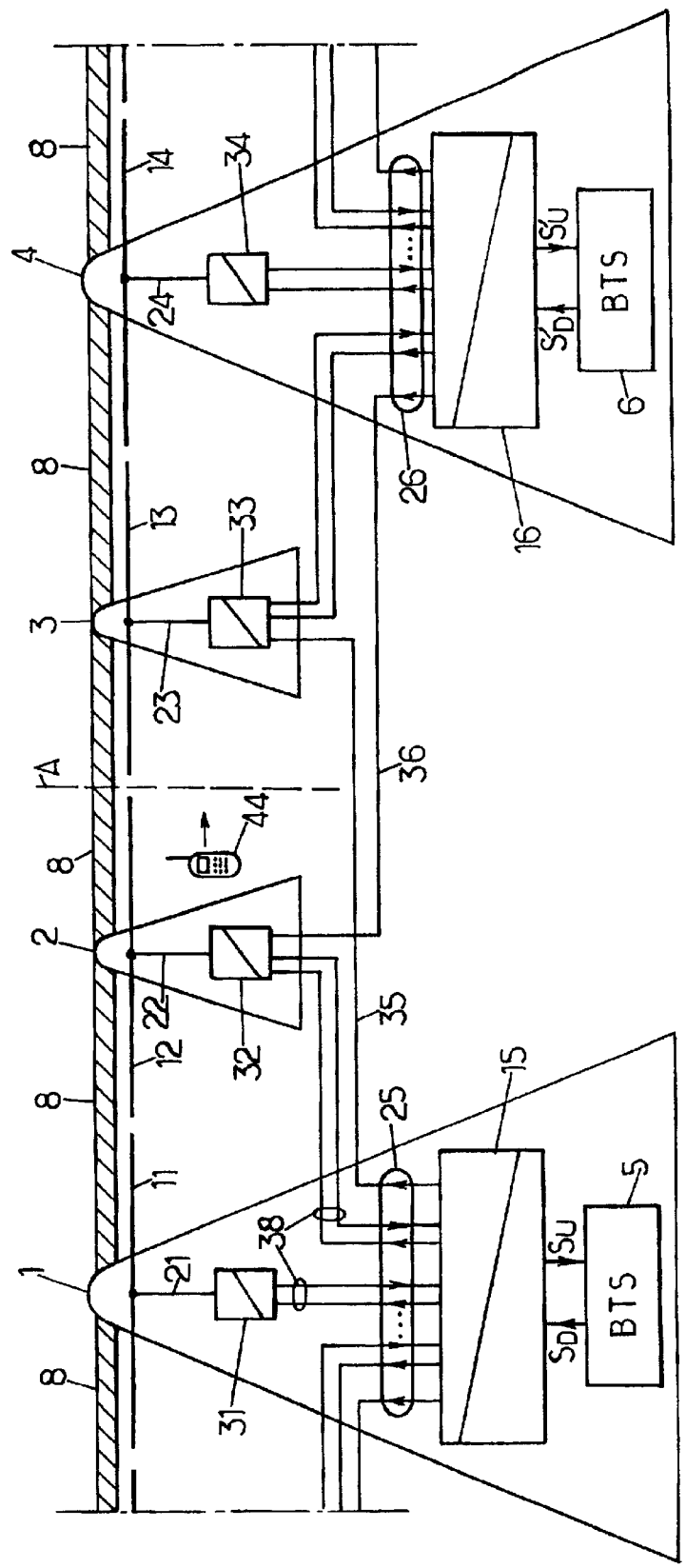
FIG. 1 is a synoptic diagram of a system as proposed by the invention.

FIG. 1 schematically illustrates deployment of a cellular mobile communication network along an underground railway line having stations 1–4 separated by tunnels 8.

Base stations (BTS) of the cellular network are disposed in some of the stations 1, 4. The antennas of these base stations 5, 6 are provided in the form of runs of loss cable 11–14 arranged one after the other along the railway systems in order to provide radio coverage inside the tunnels 8. For example, they are suspended from the roof of the tunnels 8. Each BTS 5, 6 may cooperate with several runs of loss cable, 11–12 and 13–14 respectively. The cell serviced by this BTS 5, 6 corresponds to the radio coverage zone of the different cable runs co-operating therewith. In the illustration provided in FIG. 1, line A diagrammatically represents the boundary between the cells serviced by the BTS 5 and 6 respectively.

The radio stage of each BTS 5, 6 is linked to a RF/FO coupler-multiplexer 15, 16 which acts as an interface, having a bundle 25, 26 of optical fibres (FO). For the downlink, this RF/FO coupler-multiplexer 15, 16 receives the radio frequency signal $S_D$, $S'_D$ transmitted by the BTS 5, 6, translates it in the form of light modulation and transmits it N times on the optical fibres of the bundle 25, 26, N denoting the number of runs of loss cable co-operating with the BTS 5, 6.

Each run of cable 11–14 is supplied by a respective coaxial cable 21–24 linked to a coupling and amplifying device 31–34. In a typical layout, each of the devices 31–34, the corresponding feeder cable 21–24 and the launch point (connection of the feeder cable 21–24 to the run of loss cable 11–14) is located in a station of the underground railway system 14.

For the uplink, the device 31–34 translates the RF signal collected by the cable run 11–14 in the form of a light modulation on an optical fibre as far as the relevant coupler-multiplexer 15, 16. The latter combines the uplink signals transmitted from the different runs of loss cable cooperating with its BTS 5, 6 to form the radio frequency signal $S_U$, $S'_U$ addressed thereto.

Figure 2:
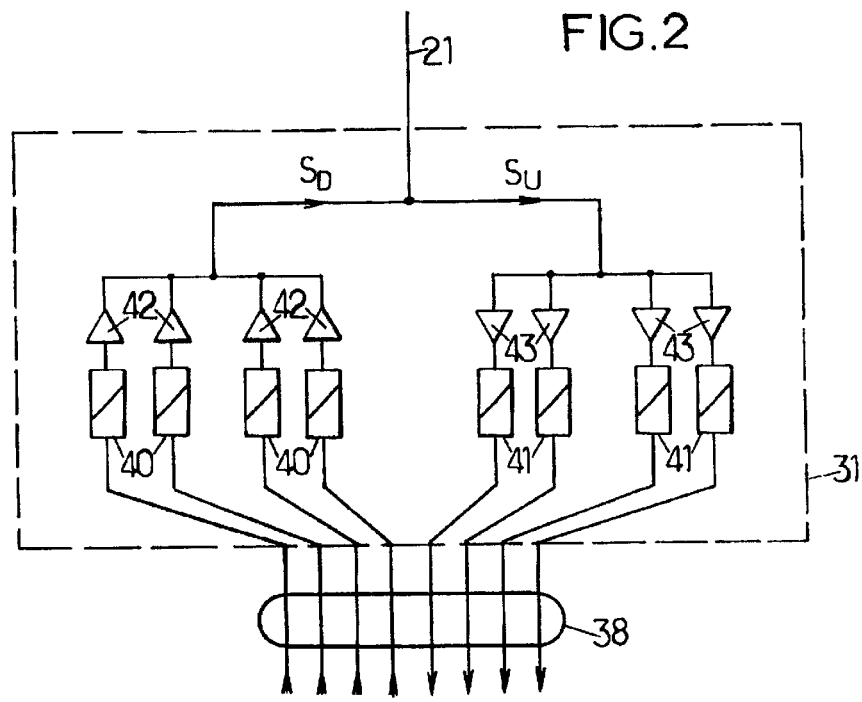
FIGS. 2 and 3 are diagrams illustrating the coupling and amplifier devices of the system illustrated in FIG. 1.

FIG. 2 provides a more detailed illustration of the structure of the device 31 illustrated in FIG. 1, in a specific example where the radio signals $S_D$, $S_U$ transmitted and received by the BTS are frequency division multiple access signals (FDMA, <<Frequency Division Multiple Access>>). In the example illustrated here, four frequencies may be used by the BTS in each direction, namely three frequencies to support traffic channels and one frequency to support a control channel. Each traffic or control channel on the downlink has, on another frequency, a corresponding traffic or control channel on the uplink. In particular, the downlink control channel carries a beacon signal specific to the cell serviced, enabling the mobile stations to select the base station and perform the steps necessary for the handover procedure. In the example described here, one optical fibre is dedicated to transmitting a specific frequency so that the portion 38 of the bundle of optical fibres 25 linking the device 31 to the coupler-multiplexer 15 of the cell is made up of eight fibres.

For each fibre, a basic FO/RF coupler 40, 41 takes charge of the translation between the radio modulation at the coaxial cable 21 end and the light modulation at the fibre end. Amplifiers RF 42, 43 are positioned downstream of the basic couplers 40 in the downlink direction and upstream of the basic couplers 41 in the uplink direction to provide adequate signalling levels. The output signals from the amplifier 42 are combined to reconstitute the radio frequency signal $S_D$ sent to the loss cable 11 via the feeder cable 21. The uplink signal $S_U$ picked up by the run of loss cable 11 is distributed to the inputs of the amplifiers 43 from the cable 21.

This signal distribution system defines the cell as being the juxtaposition of elongate zones covered by the successive cable runs 11–12 thus linked to the BTS 5. A similar distribution system may be provided in each cell along the line of the railway system. The number of runs of loss cable will vary from one cell to another. If only one run of cable is provided for a cell, the optical fibres and couplers will not be necessary since the RF output of the BTS can be applied to the cable run directly.

It should be pointed out that other layouts may be used to distribute the signals between the BTS and cable runs. In particular, some optical fibres might carry several frequencies, in a known manner, or feed several coupling and amplifier devices in series in the downlink direction.

In the example illustrated in FIG. 1, the cable run 12 is located in the zone of the cell serviced by BTS 5 which is the closest to the cell serviced by BTS 6, and the run of loss cable 13 is located in the zone of the cell serviced by BTS 6 which is the closest to the cell serviced by BTS 5.

Steps are taken so that the beacon signal from BTS 6 is also transmitted via the cable run 12 and the beacon signal from BTS 5 is also transmitted via the cable run 13, these beacon signals then being transmitted with an attenuation relative to the other signals. Accordingly, a mobile station 44 serviced by BTS 5 and located within range of the cable run 12, when directed towards the adjacent cell, is able to pick up the beacon signal of the latter in order to prepare for the handover.

In order to obtain this partial overlap between cells, an optical fibre 36 in the bundle 26, carrying the beacon signal of BTS 6, is linked to the coupling and amplifier device 32 located in the station 2. Symmetrically, an optical fibre 35 of the bundle 25, carrying the beacon signal of BTS 5, is linked to the device 33 located in the station 3.

Figure 3:
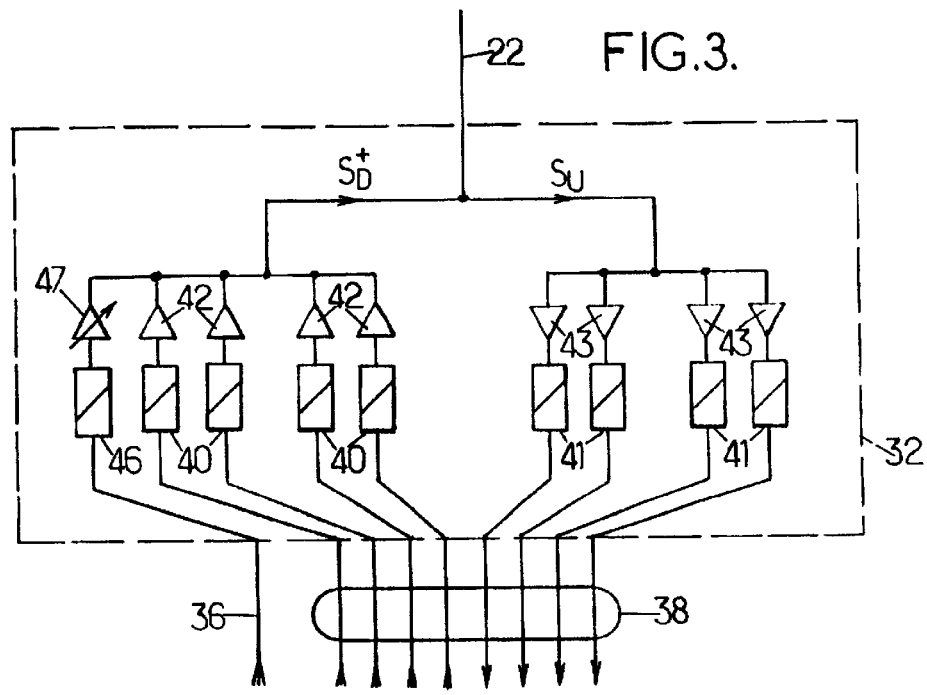

The device 32 is schematically illustrated in FIG. 3. Its structure is largely identical to that of the device 31 illustrated in FIG. 2, the same reference numbers being used to denote corresponding components. In the downlink direction, an additional basic coupler 46 translates in radio form the light modulation of the signal transmitted on the optical fibre 36 from the coupler-multiplexer 26 of the adjacent cell. At the output of this basic coupler 46, a RF amplifier 47 amplifies the frequency of the control channel, which is combined with the downlink signal $S_D$ relating to BTS 5 to form the signal $S_D+$ transmitted by the run of loss cable 12.

The amplifier 47 is controlled to have a lower gain than the amplifiers 42 of other frequencies so that the beacon signal from the adjacent cell is transmitted at a lower power than the radio signals transmitted from BTS 5. This ensures that the mobile stations will select the right BTS in the boundary zones.

In the example described above, where the cellular system is the of the FDMA type, transmission of the single frequency carrying the beacon signal of the adjacent cell into the end zone of the given cell is sufficient to provide the overlap of cells used to facilitate handover. In other types of cellular mobile communication system, it may be necessary to transmit a larger portion if not all of the signal formed by the base station of the adjacent cell into this zone.

Figure 4:
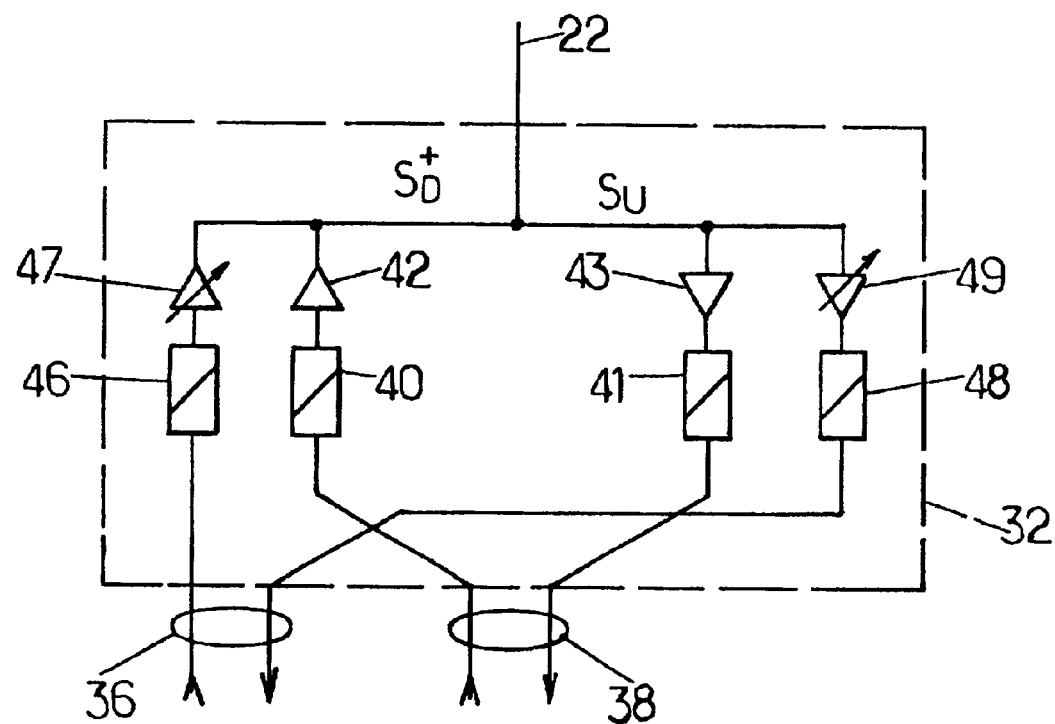
FIG. 4 is a diagram illustrating a coupling device used in a different embodiment of the system.

In the embodiment of the coupling and amplifier device 32 illustrated in FIG. 4, the optical fibres 38 connected to the coupler-multiplexer 15 of the serviced cell are capable of carrying, in one direction or the other, all the frequencies used by the BTS 5, the couplers 40, 41 and the amplifiers 42, 43, having a sufficient bandwidth. Similarly, the downlink fibre 36 is capable of carrying all the frequencies used by the BTS 6 of the adjacent cell so that the device 32 is set up to transmit all the radio signals transmitted from BTS 6, within the coverage of the cable run 12, with an attenuation regulated by the gain of the amplifier 47. Furthermore, the uplink signal $S_U$, picked up by the cable run 12 and the feeder cable 22, is forwarded to an additional RF amplifier 49, the output of which is linked to an additional RF/FO coupler 48. At the output of the coupler 48, the amplified uplink signal is carried as far as the coupler-multiplexer 16 of the adjacent cell by means of another optical fibre 36.

The embodiment illustrated in FIG. 4 enables the mobile station to address the BTS of the adjacent cell before the handover is completed, which is useful for transmitting signalling in certain systems. This may also be used in cellular systems with a macro-diversity mode, i.e. in which a mobile station may communicate simultaneously with several BTS close to the boundaries of cells.

The embodiments described above may be modified in various ways without departing from the scope of the invention. For example, the use of a multiplexing system and distribution by optical fibre depends more on the architecture of a specific cellular network than on demands imposed by the invention, which may be equally well applied in situations where the antenna of each BTS consists of a single run of loss cable. Generally speaking, the invention will find applications wherever the cellular network has adjacent cells which use loss cables as transmission elements.

If the loss cables are used to transmit other mobile services, the corresponding RF signals are mixed at the level of the feeder cables 21–24, at the output of devices 31–34. This secures an advantage in terms of flexibility since the overlap of cells proposed is produced only for the service or services which require it.

What is claimed is:

1. Mobile communication system, comprising runs of loss cable disposed in succession along a zone of radio coverage and feeder means for feeding the cable runs from base stations of at least one cellular mobile communication network, wherein the feeder means comprise:

means for applying first radio frequency signals from a first base station of the cellular mobile communication network to a first cable run, said first radio frequency signals including a first beacon signal specific to a cell serviced by said first base station;

means for applying second radio frequency signals from a second base station of the cellular mobile communication network to a second cable run which is adjacent to the first run, said second radio frequency signals including a second beacon signal specific to a cell serviced by said second base station; and, means for applying to the first cable run together with said first radio frequency signals at least part of the second radio frequency signals including said second beacon signal.

2. System as claimed in claim 1, wherein said part of the second radio frequency signals is applied to the first cable run with a given attenuation relative to the first radio frequency signals as applied to the first cable run.

3. System as claimed in claim 1, wherein the feeder means further have means for applying at least part of the first radio frequency signals to the second cable run with a given attenuation relative to the second radio frequency signals as applied to the second cable run.

4. System as claimed in claim 1, wherein all the second radio frequency signals are applied to the first cable run.

5. System as claimed claim 1, wherein the part of the second radio frequency signals applied to the first cable run is limited to the second beacon signal.

6. System as claimed in claim 1, wherein the feeder means are set up to apply the radio frequency signals from at least one of the first and second base stations to several adjacent cable runs.

7. System as claimed in claim 1, further having collection means to collect radio signals picked up by the runs of loss cable, wherein the collection means have means for applying third radio frequency signals from the first cable run to the first base station and means for applying at least part of the third radio frequency signals to the second base station.

8. System as claimed in claim 1, wherein the runs of loss cable extend through tunnels and wherein the feeder means are positioned outside the tunnels.

* * * * *